United States Patent
Lau et al.

(10) Patent No.: US 7,523,088 B2
(45) Date of Patent: Apr. 21, 2009

(54) METHOD FOR INCREASING SYSTEM RESOURCE AVAILABILITY IN DATABASE MANAGEMENT SYSTEMS

(75) Inventors: Leo Tat Man Lau, Richmondhill (CA); Marko Milek, Toronto (CA); Adil M. Sardar, Markham (CA)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 10/816,540

(22) Filed: Mar. 31, 2004

(65) Prior Publication Data

US 2005/0234842 A1 Oct. 20, 2005

(51) Int. Cl.
*G06F 7/00* (2006.01)

(52) U.S. Cl. ............................. 707/1; 707/200; 707/8; 707/10; 709/230

(58) Field of Classification Search ............... 707/1
See application file for complete search history.

(56) References Cited

U.S. PATENT DOCUMENTS

| | | | |
|---|---|---|---|
| 5,151,987 A | 9/1992 | Abraham et al. | 714/20 |
| 5,263,155 A | 11/1993 | Wang | 707/8 |
| 5,408,653 A * | 4/1995 | Josten et al. | 707/8 |
| 5,983,225 A * | 11/1999 | Anfindsen | 707/8 |
| 6,012,094 A | 1/2000 | Leymann et al. | 709/230 |
| 6,038,563 A * | 3/2000 | Bapat et al. | 707/10 |
| 6,088,757 A * | 7/2000 | Boonie et al. | 710/200 |
| 6,175,732 B1 * | 1/2001 | McDaniel et al. | 455/433 |
| 6,311,278 B1 * | 10/2001 | Raanan et al. | 726/14 |
| 6,807,540 B2 * | 10/2004 | Huras et al. | 707/8 |
| 6,842,906 B1 * | 1/2005 | Bowman-Amuah | 719/330 |
| 6,850,938 B1 * | 2/2005 | Sadjadi | 707/8 |
| 6,954,220 B1 * | 10/2005 | Bowman-Amuah | 715/741 |
| 2002/0116643 A1 * | 8/2002 | Raanan et al. | 713/201 |
| 2003/0058277 A1 * | 3/2003 | Bowman-Amuah | 345/765 |
| 2003/0208481 A1 * | 11/2003 | Neumann | 707/3 |
| 2003/0233632 A1 * | 12/2003 | Aigen et al. | 717/106 |
| 2005/0144526 A1 * | 6/2005 | Banko | 714/38 |
| 2005/0193103 A1 * | 9/2005 | Drabik | 709/221 |
| 2005/0283518 A1 * | 12/2005 | Sargent | 709/201 |
| 2006/0059253 A1 * | 3/2006 | Goodman et al. | 709/223 |

FOREIGN PATENT DOCUMENTS

WO WO0133401 A2 5/2001

\* cited by examiner

*Primary Examiner*—Wilson Lee
*Assistant Examiner*—Binh V Ho
(74) *Attorney, Agent, or Firm*—Sughrue Mion, PLLC

(57) ABSTRACT

A transactional database server is accessible by applications. Applications indicate whether access is made using an online protocol. Where the database server determines that a request received from an application is made using the online protocol, the server will return one of a set of defined error codes upon identified system resources being determined to be scarce. Applications monitor responses from the database server for the defined error codes. On receipt of one of the defined error codes an application will issue a commit to the database server to attempt to release system resources for use by applications.

9 Claims, 3 Drawing Sheets

METHOD FOR INCREASING SYSTEM RESOURCE AVAILABILITY IN DATABASE MANAGEMENT SYSTEMS

FIELD OF THE INVENTION

The present invention relates generally to database management systems and more specifically to a method for increasing system resource availability in database management systems.

BACKGROUND OF THE INVENTION

Transactional database systems are commonly implemented in a client-server environment in which applications access a database server to obtain data in response to requests submitted to the database server. For example, a relational database management system may be implemented on a server and applications will access the server by issuing relational database statements to the server. The database server will return results and/or error codes to the applications. In a transactional database system, records may be altered by an application, but until the application commits the changes, the altered database data will generally not be accessed by other applications. Database resources may be used by an application in processing a transaction and during the transaction such resources will be therefore unavailable to other applications. When the application ends the transaction by a commit or a rollback the database system resources will be released for potential use by all applications.

An example of database system resources that are made unavailable during a transaction are locks. In many cases, database management systems are designed to permit multiple applications to concurrently access data. To allow such concurrent access, database management systems typically include locks that are available for acquisition by applications to ensure the correct serialization of access to data. Database applications protect changed (inserted/deleted/updated) but uncommitted records by placing a lock on such changed records (in relational systems such a lock is a row lock). Such a lock prevents concurrent applications from accessing uncommitted records. An application holding one or more locks will release all the locks that the application holds when the current transaction ends with either a commit or a rollback.

According to certain database designs, each application is provided with a user configurable upper limit of on the number of locks that may be held at any one time. In addition, a system will have an implicit or explicit limit on the total number of locks held by all applications. Once this limit is reached, any attempt to lock an additional record may result in lock escalation. In lock escalation the application locks the target table (or other database structure) to protect all records and to allow the release of the previously held row locks. As a result, locks are made available in the system (typically, all locks require the same amount of system resources, so replacing multiple row locks with a single table lock frees system resources).

An online application is one that does not limit other concurrent applications from accessing committed (although not uncommitted) data in both read and write mode. An application holding a table lock is by definition offline, because concurrent applications are prevented from accessing the table. Therefore, for an application to stay online the application must be able to avoid lock escalation. For this reason, it is desirable to ensure that applications do not reach their defined limit of held locks.

Another system resource that can become a limiting factor in a database system that supports multiple concurrent online applications is the active log space. A characteristic of certain database management systems is that certain changes to data (for example, a change made in a relational database using SQL statements, as opposed to some data movement utilities) will result in log records being written prior to updating the database. Such logs are used in the process of database recovery in which the database is returned to a consistent state after a failure (crash recovery, or a roll-forward recovery following a database restore from a backup). If the space needed to log the change is not available in the database logs, the database language statement will fail and in most cases the current transaction will be rolled back. Active log space consumed by an application cannot be freed until the active transaction ends (commit or rollback). Since log space is shared between all applications using the same database, this resource may become scarce when multiple applications are running concurrently.

To increase the availability of resources such as record locks and log space to applications in a database environment, an autocommit protocol may be adopted. In such an approach, where possible, an application will commit the current transaction after every database system statement is issued (for example after the each SQL statement is issued in a relational database system). This provides for the release to other applications of system resources that are held by the application until the end of a transaction. After each commit, the resources, such as locks and the active log space, are made available in the database system. However, there is a cost incurred resulting from performing commits based only on the issuance of database system statements and not based on the actual or predicted demand for system resources. This may be particularly inefficient in distributed environments (multiple physical machines running the same instance of a database manager) when multiple requests might have to be executed on different database nodes.

It is therefore desirable to provide a method and system for applications to potentially release system resources when a server determines that system resources have become scarce.

SUMMARY OF THE INVENTION

Accordingly, the method of the present invention provides for improved support for increasing system resource availability in database management systems.

According to an aspect of the invention a method is provided for optimizing the number of commits performed with the objective of making system resources available to applications. According to an aspect of the invention, a method is provided for keeping concurrent applications online by triggering commits in a manner so as to make available shared system resources that are freed on termination of transactions.

According to another aspect of the invention there is provided a computer-implemented method for directing a database server to selectively release database system resources associated with a database system operatively coupled with the database server, the database server accessible by applications, the method including the steps of receiving an online protocol indicator from an application, returning a defined error condition indicator to the application when the application has forwarded the online protocol indicator and when identified system resources are determined to be scarce, and receiving a commit statement from the application when a response from the database server is determined to comprise the defined error condition indicator.

The present invention thus permits database management systems to increase the availability of system resources to applications.

BRIEF DESCRIPTION OF THE DRAWINGS

In the drawings which illustrate by way of example only a preferred embodiment of the invention.

DETAILED DESCRIPTION OF THE INVENTION

Figure 1:
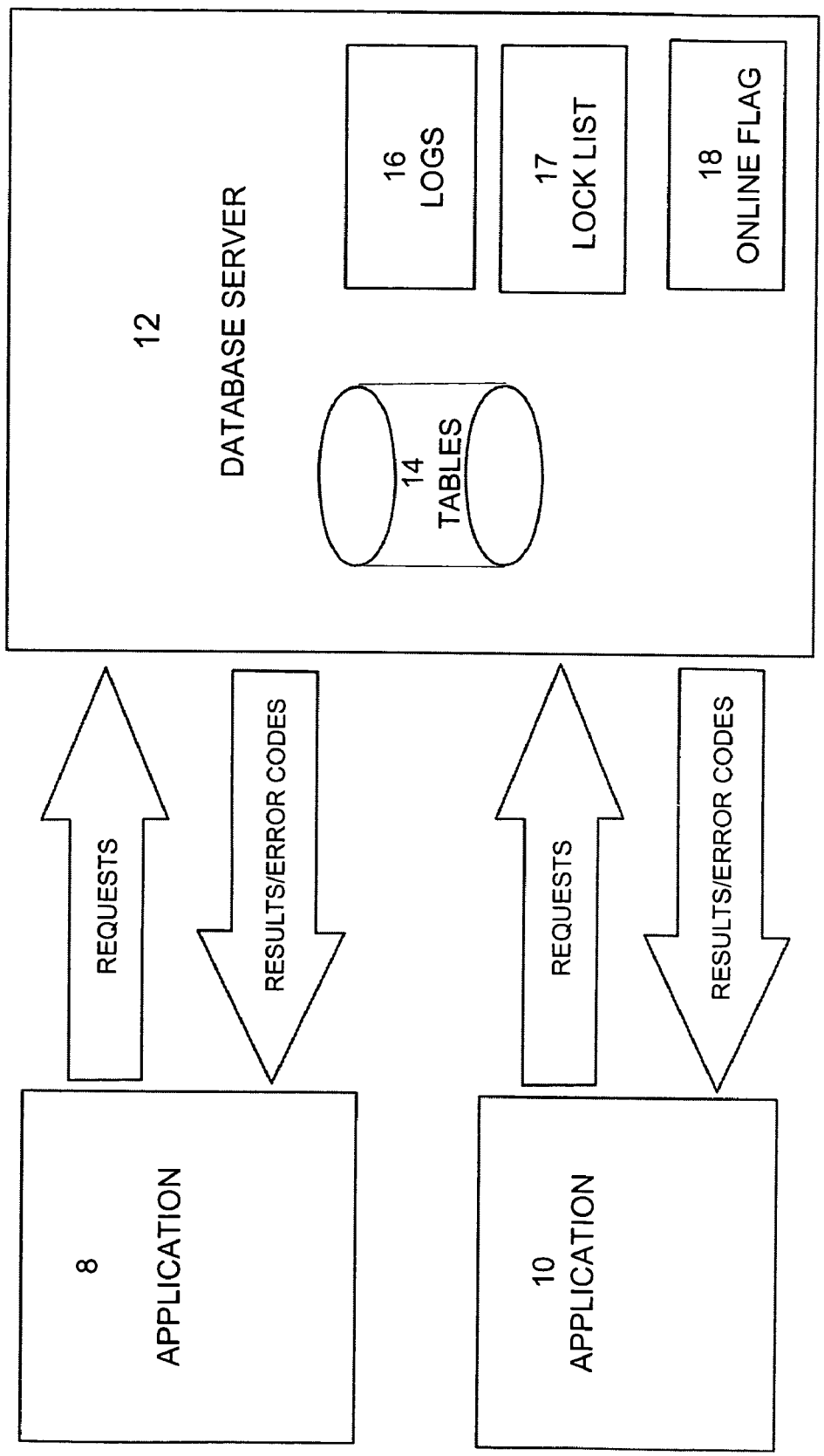
FIG. 1 is a block diagram illustrating a schematic representation of an application and server in accordance with the preferred embodiment.

The preferred embodiment of the invention is described with reference to a transactional database system and which is an SQL (Structured Query Language) relational database system. It will be appreciated by those skilled in the art that the invention may be implemented in transactional databases other than that used to illustrate the preferred embodiment.

The preferred embodiment is defined in terms of a database server accessed by applications. A database server is a computer program that manages data in a database and ensures its consistency. The term database server is synonymous with the term "database manager". An application is a computer program that accesses data stored in a database managed by a database server.

The database server of the preferred embodiment processes transactions. A transaction is a set of one or more database statements (in the preferred embodiment, SQL statements) that execute as a single operation. The term transaction is synonymous with the term unit of work. Transactions are defined by applications and the manner in which applications send database statements to the database server. In the description of the preferred embodiment, a multi-transactional application is an application that executes a sequence of transactions and that does not impose strictly defined transaction boundaries.

As will be appreciated by those skilled in the art, a database application may permit, or alternatively may limit, other concurrent applications from accessing (in both read and write mode) committed data maintained in the database. Where an application permits other concurrent applications to have such access to committed data, the application is considered to be online. To allow access to data in the database server it is preferred to keep all applications online.

A commit in the database system of the preferred embodiment terminates a transaction and commits the database changes that were made by an application in that transaction. Database changes are said to be committed if the transaction that made them was successfully committed. Otherwise, database changes are said to be uncommitted. An alternative to a commit is a rollback. A rollback terminates a transaction and backs out the database changes that were made by that transaction.

In the preferred embodiment, database statements executed within a single transaction are either committed or rolled back. Hence a transaction can be thought of as a single logical operation. This property of a transaction is referred to as atomicity. For an application to be considered to be multi-transactional, as the term is used in this description, the application must be able to permit a transaction to be interrupted by a commit without affecting the logic of the originally defined transaction. In other words, any given statement in a transaction must be capable of being placed in a different unit of work, without affecting the logic of the application for the application to be considered multi-transactional. Any application guaranteeing atomicity of a sequence of operations (i.e. the whole sequence has to be either committed or rolled back) is not multi-transactional.

In the preferred embodiment, locks are made available by the database system to provide a means of ensuring data integrity while attempting to reduce resource conflicts. Each application using a shared resource will acquire a lock on the resource to ensure its consistency throughout the transaction. It will be understood that a lock is, itself, a system resource.

FIG. 1 is a block diagram illustrating an extremely simple example arrangement of a database server and applications in accordance with the preferred embodiment. FIG. 1 shows applications 8, 10. Both applications are able to access database server 12. Server 12 includes tables 14 logs 16, and lock list 17. In SQL database server 12 in the preferred embodiment, relational data is stored in tables 14.

In use, applications 8, 10 submit database requests to server 12. In response, database server 12 sends results and/or error codes to the appropriate application 8, 10. As transactions are processed, their execution is tracked within the active log files 16. Information in log files 16 is used during a transaction rollback and during a database recovery. Lock list 17 maintains a list of locks available and used in the database system.

Database server 12 supports applications 8, 10 accessing database server 12 using a specified online protocol. Where one of applications 8, 10 accesses database server 12 in using the online protocol, database server 12 follows a sequence of operations (as set out in more detail below) that will seek to increase the system resources available to applications 8, 10. It will be appreciated that other implementations may identify or specify applications as being online in different manners but in the preferred embodiment an online flag is used to specify whether a given application is accessing the database server in the online mode.

When one of applications 8, 10 sets online flag 18 in database server 12 it means that the application is (for at least the time that online flag 12 is set) a multi-transactional application. In the terminology of the preferred embodiment, the application is using the online protocol. The application may issue a commit at any time that online flag 18 is set without changing the logic of the application. As will be appreciated, database server 12 needs to be informed as to whether the requestor application is using the online protocol. This can be done either on the application level, or on the statement level.

An application level online flag can be set (or reset) in the memory of database server 12 by executing a new database request. In the preferred embodiment, this request can be implemented either as a new SQL statement, or as a stored procedure executing on server 12. Alternatively, or additionally, a statement level online indicator is sent to the server as a part of each SQL statement. In the preferred embodiment, this is achieved by extending the SQL syntax to include a new keyword (such as 'ONLINE') that is able to be specified for various SQL statements. Upon recognizing the specified keyword, a compiler in server 12 (not shown) setups the necessary information in database server 12 before the request containing the statement with the keyword is executed at server 12.

In the preferred embodiment, both approaches may be implemented. Server 12 will execute the operations as set out below defined for the online protocol if either online flag 18 is set by an application request or the statement being executed carries the online indicator. A statement level online indicator offers more flexibility, but the cost is higher because the information has to be distributed (potentially to many database nodes in a distributed system) with every SQL request. Setting the single application level flag in server 12 using a request is more efficient because only a one-time cost is incurred. As will be appreciated, online flag 18 may be implemented in a number of different ways and the existence of a single data element capable of storing different values is not necessary to achieve the functionality of online flag 18.

Figure 2:
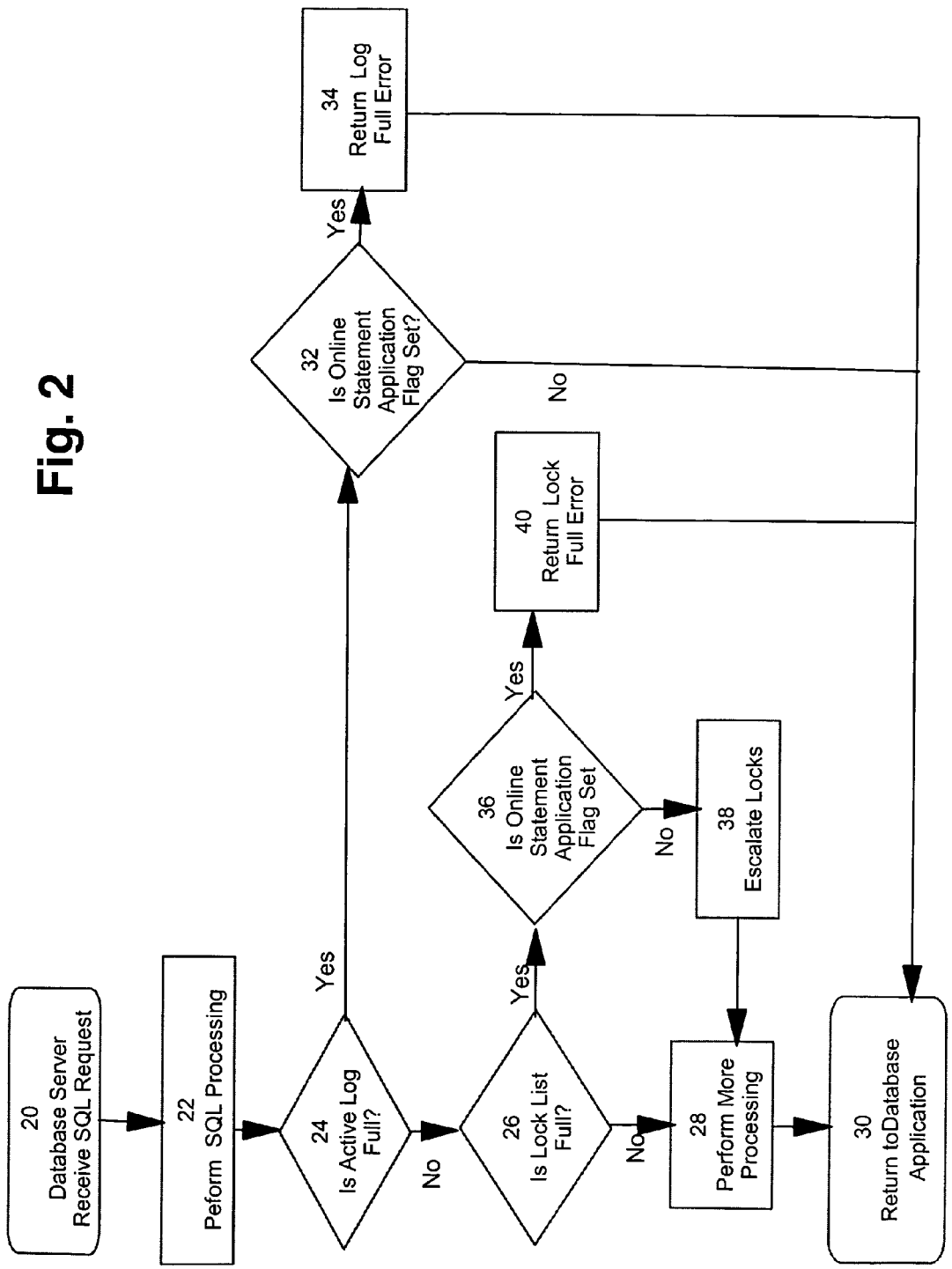
FIG. 2 is a flow chart showing the operation of the preferred embodiment on the server of the preferred embodiment.

According to the preferred embodiment, when execution of a request from an application occurs under the online protocol, the server will provide a specified error code to the requesting application when system resources are identified as being scarce. FIG. 2 is a flow chart that illustrates the operation of server 12 in accordance with the preferred embodiment in which active log and lock list resources are subject to the online protocol. In the example shown, server 12, when executing in accordance with the online protocol, will return the specific error code to the application if either the lock list is full, or if the active log space is full.

Server 12 receives a request from one of applications 8, 10 (box 20 in FIG. 2). In response to the received request, server 12 performs SQL processing (box 22). Server 12 will interrogate logs 16 to determine if the active log is full (decision block 24). If the active log is not full server 12 will determine if there are available locks (decision block 26). As will be appreciated, the definition of "full" in the above description may be dependent on system design and may be determined such that there remains some portion of the active log or lock list that is available when the "full" condition is met.

If neither the active list is full nor the lock list is full, server 12 will continue with processing (block 28). When the processing is complete server 12 will return a result or an error code to the database application (block 30). As will be appreciated, server 12 may interrogate the active logs and the lock list more than a single time.

If the active log is determined to be full (decision block 24) then server 12 determines whether the online protocol is being followed (decision block 32). If online protocol flag 18 is not set, then server 12 returns to the requesting application. Alternatively, if online protocol flag 18 is set, server 12 returns the log full error to the requesting application (blocks 34, 30).

Similarly, if the lock list is determined to be full (decision block 26) then the determination is made as to whether the online protocol applies (decision block 36). If online protocol flag 18 is set, the a lock full error code is returned by server 12 to the requesting application (blocks 34,30). If online flag 18 is not set, server 12 escalates locks (block 38) and more processing is carried out (block 28). In this alternative, the requesting application effectively goes offline.

As may be seen, when an application is in online protocol mode and one of the system resources reaches a defined level of scarcity, server 12 returns an error code to the requesting application. The code is related to, and in the preferred embodiment the code specifies, the particular resource that has become scarce.

From the application side of the preferred embodiment, to specify use of the online protocol either a one time request is executed against database server 12, or the specified online keyword is included when preparing every SQL statement, depending on whether the application level or statement level flag specification is more appropriate for the application.

While processing SQL statements, each of applications 8, 10 monitors the error codes potentially returned from server 12. By setting online protocol flag 18 an application indicates that it is a multi-transactional application and that consequently executing a commit while the flag is set will not affect the logic of the application. Thus, when a specific error code relating to system resource scarcity is received by the application from database server 12, application is able to trigger a commit and therefore release held resources, without affecting the application logic. In the example of the preferred embodiment, executing a commit will potentially free lock space or active log space resources. If a commit fails to free the resources (due to an error), a re-executed statement will fail with the same specific error code. In such a case, the transaction will then be rolled back.

Figure 3:
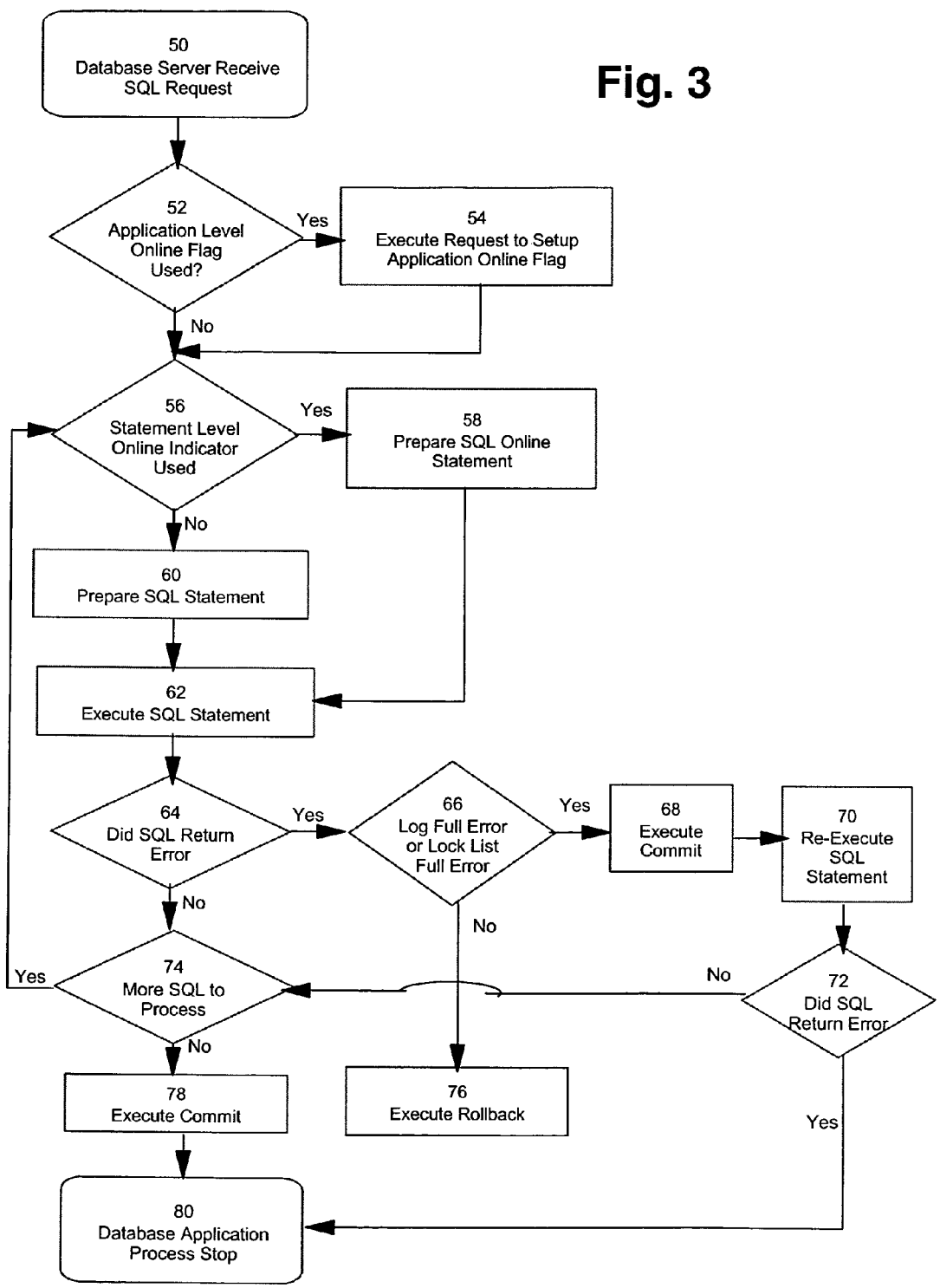
FIG. 3 is a flow chart showing the operation of an application in accordance with the preferred embodiment.

This process of releasing resources is shown in the flow chart of FIG. 3. The application process start is shown in block 50. If an application level online flag is used then a request to the server to setup the appropriate flag is made (blocks 52, 54). If a statement level online indicator is used, then an SQL online statement is prepared (blocks 56, 58). If there is no statement level online indicator used, then the application prepares the SQL statement without the indicator (block 60). The prepared SQL statement is then executed (block 62). The application monitors the responses from the server and if an error is returned it is checked to see the type of error (decision blocks 64, 66). A commit is executed if the error returned is a log full error or a lock list full error (blocks 66, 68). After a commit, the statement is re-executed (block 70). The return from the server is then checked and if there is an SQL error a rollback is executed (blocks 72, 76). Otherwise, the application determines whether there are more SQL statements to process. If there are then the application returns to block 56. Otherwise a commit is executed to terminate the defined transaction (blocks 74, 78). The database application process then stops (block 80).

As may be seen from the above description, system resources are potentially made available to applications by applications specifying an online protocol to the database server. The above example refers to lock and log resources but other resources that can be freed by committing database changes may be similarly treated. By the server providing specific error codes that relate to the scarcity of database system resources, the application is able to issue a commit to allow resources to be freed up and to prevent, for example, lock escalation.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A computer-implemented method for directing a database server to selectively release database system resources associated with a database system operatively coupled with the database server, the database server accessible by applications, the method comprising:

receiving an online protocol indicator from an application, wherein the online protocol indicator comprises adding a pre-defined keyword to a database statement included in a request sent by the application to the database server, returning a defined error condition indicator to the application when the application has forwarded the online protocol indicator and when identified system resources are determined to be scarce, and receiving a commit statement from the application when a response from the database server is determined to comprise the defined error condition indicator, wherein the application is a multi-transactional application;

the defined error condition indicator is returned to the application if at least one of a lock list and an active log space is full;

the database server interrogates the active log to determine if the active log is full and interrogates the lock list to determine if the lock list is full; and the application issues the commit at any time without changing a logic of the application while the application has forwarded the online protocol indicator.

2. The computer-implemented method of claim 1, wherein the request sent by the application to the data base server is one of a statement level and application level flag specification.

3. The computer-implemented method of claim 2, wherein the request includes executing a one time request against the database server if the request is the application level flag specification.

4. The computer-implemented method of claim 2, wherein the request includes preparing a specified online keyword with every SQL statement if the request is the statement level flag specification.

5. The computer implemented method of claim 1, wherein the database statement is an Structured Query Language (SQL) statements.

6. The computer implemented method of claim 5, wherein the pre-defined keyword is ONLINE and the keyword ONLINE is included in the SQL statements.

7. The computer implemented method of claim 1, wherein executing the commit statement does not affect the logic of the application when the online protocol indicator is received.

8. A computer-implemented method for directing a database server to selectively release database system resources associated with a database system operatively coupled with the database server, the database server accessible by applications, the method comprising:

receiving a request at the database server to set up an online flag, if an application level online flag is used;

preparing and executing a structured querying language (SQL) statement with an online indicator if a statement level online indicator is used;

monitoring responses from the database server by the application to check if an error is returned;

determining the type of error returned;

executing a commit if the error returned is a log full error or if the error is not a log full error and the error is a lock list full error; and executing a rollback if the error is an SQL error.

9. A computer-implemented method for directing a database server to selectively release database system resources associated with a database system operatively coupled with the database server, the database server accessible by applications, the method comprising:

receiving a request at the database server to perform Structured Querying Language (SQL) processing from an application;

determining if an active log is full;

determining if lock list is full, if the active log is not full;

determining if an online protocol is set, if the active log is determined to be full or the lock list is determined to be full;

returning a log full error or lock full error to the requesting application if the online protocol is set; and receiving a commit statement from the application when a response from the database server is determined to comprise the log full error or lock full error.

* * * * *